(12) United States Patent
Kamiya

(10) Patent No.: US 6,704,486 B2
(45) Date of Patent: Mar. 9, 2004

(54) OPTICAL FIBER AND OPTICAL SIGNAL TRANSMISSION SYSTEM USING THIS OPTICAL FIBER

(75) Inventor: Tamotsu Kamiya, Chiba (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 11 days.

(21) Appl. No.: 10/189,412

(22) Filed: Jul. 8, 2002

(65) Prior Publication Data

US 2003/0081920 A1 May 1, 2003

(30) Foreign Application Priority Data

Jul. 9, 2001 (JP) .................................. 2001-207468

(51) Int. Cl.⁷ ................................................ G02B 6/02
(52) U.S. Cl. ...................................... 385/124; 385/147
(58) Field of Search .............................. 385/122–126, 385/141, 147

(56) References Cited

U.S. PATENT DOCUMENTS 4,168,427 A * 9/1979 Hubbard ..................... 398/138

FOREIGN PATENT DOCUMENTS

EP          1275991     *  1/2003  ................. 385/124

* cited by examiner

*Primary Examiner*—Akm Enayet Ullah
(74) *Attorney, Agent, or Firm*—Oblon, Spivak, McClelland, Maier & Neustadt, P.C.

(57) ABSTRACT

An optical fiber having a good signal-to-noise ratio (SNR) and high Raman efficiency in an optical signal transmission system using Raman amplification, the optical fiber having a refractive index profile, including at least one annular region between a center core and a cladding layer, a Rayleigh scattering coefficient not more than 1 $\mu m^4 \cdot dB/km$, a relative refractive index difference of the center core with respect to the cladding layer of a positive value not more than 0.9%, a relative refractive index difference of an annular region adjoining the center core with respect to the cladding layer from −0.7% to −0.2%, an effective area (Aeff) Aeff not more than 60 $\mu m^2$, and a zero dispersion wavelength outside of the range of 1400 to 1600 nm, and an optical signal transmission system using that optical fiber for part of the optical signal transmission line in a Raman amplifier or as an optical signal amplification fiber and introducing wavelength multiplexed stimulated light into the optical fiber so as to obtain an amplification effect.

6 Claims, 3 Drawing Sheets

OPTICAL FIBER AND OPTICAL SIGNAL TRANSMISSION SYSTEM USING THIS OPTICAL FIBER

BACKGROUND OF THE INVENTION

1. Field of the Invention

The present invention relates to an optical fiber, more particularly relates to an optical fiber suitably used for wavelength division multiplexing (WDM) transmission and an optical signal transmission system (optical signal transmission line) using that optical fiber.

2. Description of the Related Art

Increasing the transmission capacities in optical signal transmission systems by using WDM transmission is being actively studied. Recently, in particular, WDM transmission systems using Raman amplification have also been studied.

Raman amplification will be explained here. In general, when light strikes glass or another substance, the molecular vibration or lattice vibration of that substance causes the generation of light of a somewhat longer wavelength than the original wavelength. This light is called Raman scattering light. When the stimulated light introduced is made more intensive, further, intensive phase-aligned Raman scattering light may be produced. This is called "induced Raman scattering light". When the introduced signal light and the induced Raman scattering light match in wavelength, the induced Raman scattering light is changed to the same degree as the signal light and the signal light is amplified. In this way, "Raman amplification" is a technique for amplification of an optical signal using the fact that light scattered by atoms making up the material, that is, a silica-based glass (induced Raman scattering light), is converted to a wavelength different from that at the time of incidence and scattered when intensive stimulated light is introduced fired into an optical fiber.

Raman amplifier uses the amplification action arising due to a non-linear optical phenomenon occurring in an optical fiber in this way.

In Raman amplification, the phenomenon is known where the maximum value of a Raman gain is obtained at a wavelength away from a stimulated light source wavelength by about 100 nm to a longer wavelength side. Using this phenomenon, it has been attempted to amplify a WDM optical signal using a plurality of stimulated light sources of different wavelengths (hereinafter referred to as a "wavelength multiplexed stimulated light source").

Here, a wavelength band of the wavelength multiplexed stimulated light source has to be no more than about 100 nm so that the stimulated light at a longest wavelength of the wavelength multiplexed stimulated light source does not overlap the signal light at a shortest wavelength of the WDM signal.

To realize an optical transmission system using such Raman amplification, it is necessary to prevent waveform distortion from becoming irreparable in the signal light at transmission repeating points and a receiving station. Therefore, it is effective to suppress a non-linear phenomenon in the optical transmission line and reduce the cumulative chromatic dispersion in the optical transmission line.

In an optical transmission system using Raman amplification, use of a single mode optical fiber (SMF) having zero dispersion near a wavelength at 1.3 $\mu$m or an optical fiber increasing in dopant for raising a refractive index of a core and thereby improved in Raman efficiency is being studied for the portion of an optical transmission line for Raman amplification.

Since SMF has a relatively large effective area (Aeff) of about 80 $\mu m^2$, SMF is poor in efficiency for Raman amplification. When using SMF, an optical power of at least 1 W is required in total for the wavelength multiplexed stimulated light source. This is not economical.

Further, an optical fiber increasing in dopant so as to raise a refractive index of a core has inherently large Rayleigh scattering. The Rayleigh scattering coefficient is known as an indicator expressing the magnitude of the Rayleigh scattering. The value of the Rayleigh scattering coefficient is about 0.9 $\mu m^4 \cdot dB/km$ with the above-mentioned SMF, while is almost always more than 1.1 $\mu m^4 \cdot dB/km$ with an optical fiber increasing in dopant to raise the refractive index of the core.

If an optical fiber having such a large Rayleigh scattering coefficient is used for Raman amplification, a phenomenon where a noise component scattered at the rear of a optical transmission line scatters to the front of the next optical transmission line and is superposed on the signal, that is, double Rayleigh scattering, is apt to occur and the signal-to-noise ratio (SNR) tends to fall.

Further, an optical fiber increasing in dopant to raise a refractive index of a core has a zero dispersion wavelength in the signal light band or stimulated light band, so was susceptible to the disadvantages of four wave mixing (FWM) etc.

Either of deterioration of the SNR or occurrence of FWM becomes a factor causing deterioration of the bit error rate (BER) at the time of WDM transmission, so it is not suitable to use an optical fiber with a large Rayleigh scattering coefficient or an optical fiber increasing in dopant for raising a refractive index of a core for the purpose of Raman amplification in a dense WDM (DWDM) transmission system where the BER has to be kept low.

That is, the above two types of optical fibers suffered from the disadvantages that they were not suitable as optical fibers for Raman amplification.

SUMMARY OF THE INVENTION

An object of the present invention is to provide an optical fiber having a small Rayleigh scattering coefficient and a high Raman efficiency.

Another object of the present invention is to provide an optical fiber not having a zero dispersion wavelength in a signal light wavelength band and stimulated light wavelength band.

Still another object of the present invention is to provide an optical signal transmission system (optical signal transmission line) performing Raman amplification by using such an optical fiber.

According to a first aspect of the present invention, there is provided an optical fiber having a refractive index profile, including at least one annular region between a center core and a cladding layer, having a Rayleigh scattering coefficient not more than 1 $\mu m^4 \cdot dB/km$, a first relative refractive index difference of the center core with respect to the cladding layer of a positive value of not more than 0.9%, a second relative refractive index difference of an annular region adjoining the center core with respect to the cladding layer from −0.7% to −0.2%, and an effective area (Aeff) not more than 60 $\mu m^2$.

According to a second aspect of the present invention, there is provided an optical signal transmission system having an optical signal transmission apparatus for transmitting an optical signal, a Raman amplification means for amplifying signal light transmitted from the optical signal transmission apparatus, and an optical signal reception apparatus for receiving a signal transmitted from the Raman amplification means, the Raman amplification means having an optical signal transmission line including in at least part an optical fiber having a refractive index profile including at least one annular region between a center core and a cladding layer and having a Rayleigh scattering coefficient not more than 1 $\mu m^4 \cdot dB/km$, a first relative refractive index difference $\Delta 1$ of the center core with respect to the cladding layer of a positive value of not more than 0.9%, a second relative refractive index difference $\Delta 2$ of an annular region adjoining the center core with respect to the cladding layer from −0.7% to −0.2%, and an effective area (Aeff) not more than 60 $\mu m^2$ and receiving signal light emitted from the optical signal transmission apparatus, a wavelength multiplexed stimulated light source for providing a plurality of stimulated light having different wavelengths, and an optical coupling means for coupling an optical signal transmitted from the optical signal transmission line and an optical signal transmitted from the wavelength multiplexed stimulated light source and performing Raman amplification by wavelength multiplexed stimulated light incident into the optical fiber in the optical signal transmission line from the wavelength multiplexed stimulated light source.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Before explaining the embodiments of the invention, the general subject of the present invention will be explained. The Rayleigh scattering coefficient is a parameter which fluctuates affected by various factors such as the refractive index profile, glass composition, and manufacturing conditions. It cannot be defined even if just for example taking up the shape of the refractive index profile. From the viewpoint that it is good to measure the Rayleigh scattering coefficient of an optical fiber directly when trying to consider a Rayleigh scattering coefficient for judgement of the suitability of an optical fiber used for a Raman amplification system for the system, the inventors considered the Rayleigh scattering coefficient of optical fibers used for Raman amplification systems and discovered and defined suitable values for the same as illustrated in Table 1 and Table 2.

Further, the required characteristics of the optical fiber are dependent on the configuration of the transmission line. Therefore, the shape of the refractive index profile is selected to satisfy the required transmission characteristics of the optical fiber. The optical fiber illustrated in FIGS. 1A and 1B and the optical fiber illustrated in FIGS. 2A and 2B, which are explained below as embodiments according to the present invention, are satisfied each different required characteristics. The difference in the effects and actions result in differences in the required characteristics of the optical fiber. To realize these, it is possible to suitably select the optical fibers of the configurations illustrated in FIGS. 1A and 1B and FIGS. 2A and 2B explained below.

Embodiments of the optical fiber and an optical signal transmission system using the optical fiber will be described with reference to the accompanying drawings.

First Embodiment of Optical Fiber

Figure 1A:
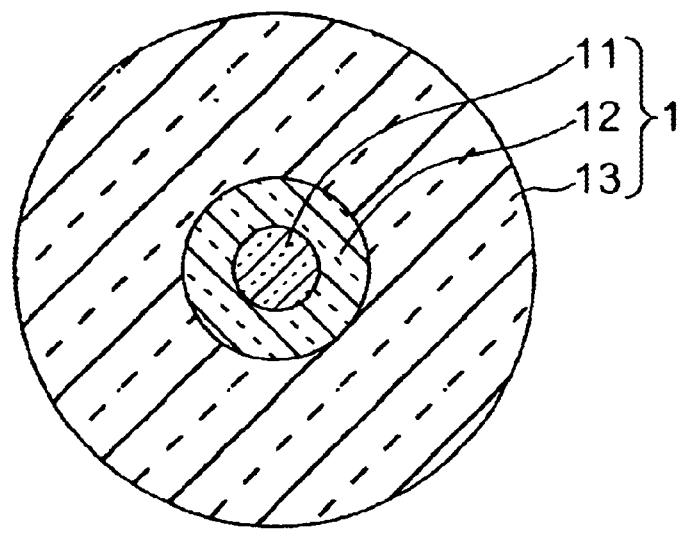
FIG. 1A is a sectional view of a first embodiment of an optical fiber according to the present invention.
Figure 1B:
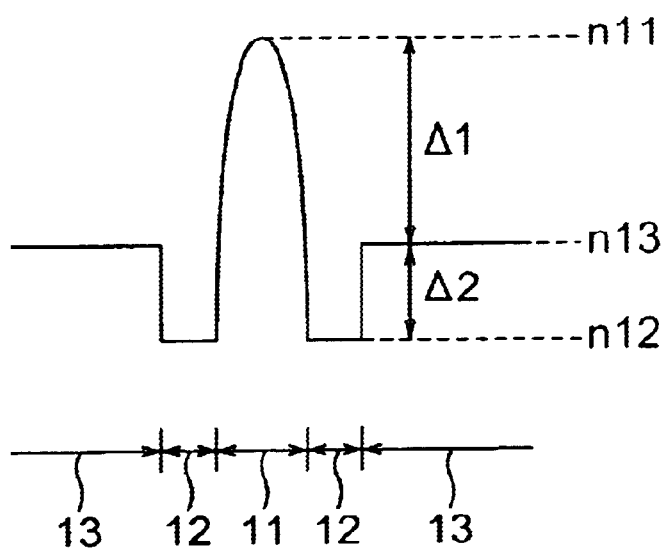
FIG. 1B is a graph illustrating a refractive index profile of the optical fiber illustrated in FIG. 1A.

FIG. 1A is a sectional view of a first embodiment of an optical fiber according to the present invention, while FIG. 1B is a graph illustrating the refractive index profile of the optical fiber illustrated in FIG. 1A.

The optical fiber 1 of the first embodiment illustrated in FIG. 1A and FIG. 1B has a center core 11, an annular region 12 formed adjoining the peripheral of the center core 11, and a cladding layer 13 formed on the peripheral of the annular region 12.

The refractive index of the center core 11 is designated here as n11, the refractive index of the annular region 12 as n12, and the refractive index of the cladding layer as n13.

The relative refractive index difference between the cladding layer 13 and the center core is designated as $\Delta 1$, while the relative refractive index difference between the cladding layer 13 and the annular region 12 is designated as $\Delta 2$. The relative refractive index differences $\Delta 1$ and $\Delta 2$ are defined by the following equations:

$$\Delta 1 = \frac{n11^2 - n13^2}{2n11^2} \times 100 \simeq \frac{n11 - n13}{n11} \times 100 \ (\%) \tag{1}$$

$$\Delta 2 = \frac{n12^2 - n13^2}{2n12^2} \times 100 \simeq \frac{n12 - n13}{n12} \times 100 \ (\%) \tag{2}$$

The refractive index n12 of the annular region 12 is smaller than the refractive index n13 of the cladding layer 13. The refractive index n11 of the center core 11 is higher than the refractive index n13 of the cladding layer 13. Therefore, in the example illustrated in FIG. 1B, $\Delta 1>0$, $\Delta 2<0$.

Characteristics of Optical Fiber

The optical fiber illustrated in FIG. 1A and FIG. 1B is formed to have a Rayleigh scattering coefficient of not more than 1 $\mu m^4 \cdot dB/km$, a first relative refractive index difference $\Delta 1$ of a positive value of not more than 0.9%, a second relative refractive index difference $\Delta 2$ of −0.7% to −0.2%, and an effective area (Aeff) of not more than 60 $\mu m^2$.

The reason why the Rayleigh scattering coefficient is made not more than 1 $\mu m^4 \cdot dB/km$ is that when the Rayleigh scattering coefficient is larger than this value, deterioration of the SNR due to double Rayleigh scattering can no longer be ignored.

The reason why the first relative refractive index difference $\Delta 1$ is made a positive value of not more than 0.9% is that if the first relative refractive index difference $\Delta 1$ is made larger than 0.9%, it is more possible for the Rayleigh scattering coefficient to become greater than 1 $\mu m^4 \cdot dB/km$ and deterioration of the SNR can no longer be ignored.

The reason why the second relative refractive index difference Δ2 is made from −0.7% to −0.2% is that if the second relative refractive index difference Δ2 is outside of this range, it is not possible for the optical fiber becoming very suitable to WDM transmission even if the first relative refractive index difference Δ1 is made a positive value of not more than 0.9%.

The reason why the effective area (Aeff) is made not more than 60 μm² is that a drop in the efficiency of Raman amplification is induced when the effective area (Aeff) is larger than 60 μm².

In the optical fiber illustrated in FIG. 1A and FIG. 1B, the zero dispersion wavelength is preferably outside the range of 1400 nm to 1600 nm.

The reason why the zero dispersion wavelength is made outside of the range of 1400 nm to 1600 nm is that when performing WDM transmission around the wavelength of 1500 to 1600 nm using Raman amplification, if the zero dispersion wavelength is in the range of 1400 nm to 1600 nm, it is more possible for FWM to occur in the wavelength band of the stimulated light or signal light.

Note that as the characteristics of the optical fiber, only the upper limits of the Rayleigh scattering coefficient, first relative refractive index difference Δ1, and effective area (Aeff) are defined, but if either the Rayleigh scattering coefficient or first relative refractive index difference Δ1 increases, the other also increases. Further, if either the Rayleigh scattering coefficient or the effective area (Aeff) increases, the other decreases. Therefore, by defining the upper limits of the Rayleigh scattering coefficient, first relative refractive index difference Δ1, and effective area (Aeff), the lower limits are substantially also defined.

Second Embodiment of Optical Fiber

Figure 2A:
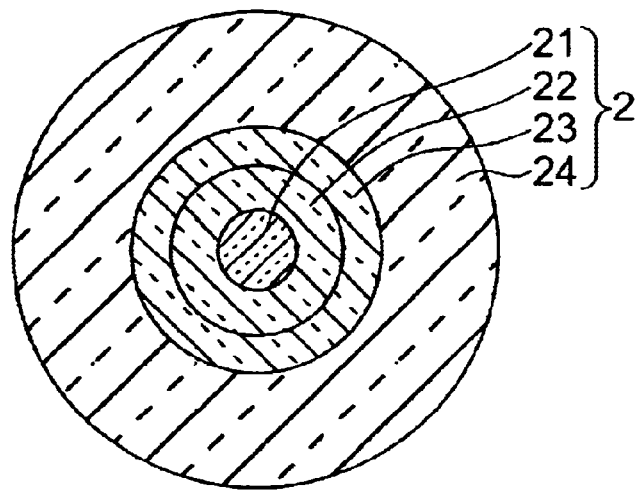
FIG. 2A is a sectional view of a second embodiment of the optical fiber according to the present invention.
Figure 2B:
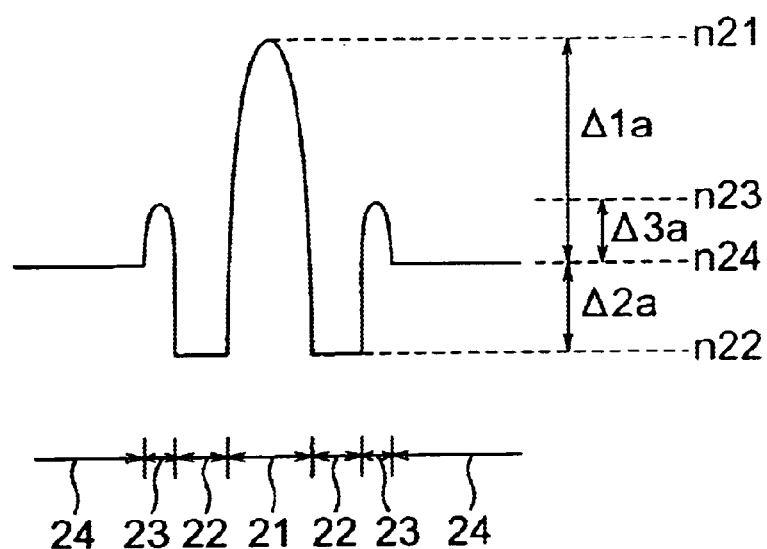
FIG. 2B is a graph illustrating a refractive index profile of the optical fiber illustrated in FIG. 2A.

FIG. 2A is a sectional view of a second embodiment of the optical fiber of the present invention, while FIG. 2B is a graph illustrating the profile of the refractive index of the optical fiber illustrated in FIG. 2A.

The optical fiber 2 of the second embodiment illustrated in FIG. 2A and FIG. 2B has a first annular region 22 formed on the peripheral of the center core 21, a second annular region 23 formed on the peripheral of the first annular region 22, and a cladding layer 24 formed on the peripheral of the second annular region 23.

Compared with the optical fiber 1 illustrated in FIG. 1A and FIG. 1B, the optical fiber 2 illustrated in FIG. 2A and FIG. 2B has the additional second annular region 23.

The refractive index of the center core 21 is designated as n21, the refractive index of the first annular region 22 as n22, the refractive index of the second annular region 23 as n23, and the refractive index of the cladding layer 24 as n24.

The first relative refractive index difference between the cladding layer 24 and the center core 21 is designated as Δ1a, the second relative refractive index difference between the cladding layer 24 and the first annular region 22 as Δ2a, and the relative refractive index difference between the cladding layer 24 and the second annular region 23 as Δ3a.

The relative refractive index differences Δ1a, Δ2a, and Δ3a are defined by the following formulas:

$$\Delta 1a = \frac{n21^2 - n24^2}{2n21^2} \times 100 \simeq \frac{n21 - n24}{n21} \times 100 \ (\%) \quad (3)$$

$$\Delta 2a = \frac{n22^2 - n24^2}{2n22^2} \times 100 \simeq \frac{n22 - n24}{n22} \times 100 \ (\%) \quad (4)$$

$$\Delta 3a = \frac{n23^2 - n24^2}{2n23^2} \times 100 \simeq \frac{n23 - n24}{n23} \times 100 \ (\%) \quad (5)$$

The refractive index n22 of the first annular region 22 is smaller than the refractive index n24 of the cladding layer 24. The refractive index n21 of the center core 21 is higher than the refractive index n24 of the cladding layer 24. The refractive index n23 of the second annular region 23 is higher than the refractive index n24 of the cladding layer 24 and lower than the refractive index n21 of the center core 21. Therefore, in the example illustrated in FIG. 2B, Δ1a>0, Δ2a<0, and Δ3a>0.

Characteristics of Optical Fiber

The optical fiber illustrated in FIG. 2A and FIG. 2B, like the optical fiber illustrated in FIG. 1A and FIG. 1B, is formed to have a Rayleigh scattering coefficient of not more than 1 μm⁴·dB/km, a first relative refractive index difference Δ1a of a positive value of not more than 0.9%, a second relative refractive index difference Δ2a of −0.7% to −0.2%, and an effective area (Aeff) of not more than 60 μm².

The reason why the Rayleigh scattering coefficient is made not more than 1 μm⁴·dB/km, the reason why the first relative refractive index difference Δ1a is made a positive value of not more than 0.9%, the reason why the second relative refractive index difference Δ2a is made from −0.7% to −0.2%, and the reason why the effective area (Aeff) is made not more than 60 μm² are the same as the reasons explained for the optical fiber illustrated in FIG. 1A and FIG. 1B.

In the optical fiber illustrated in FIG. 2A and FIG. 2B as well, the zero dispersion wavelength is preferably outside the range of 1400 nm to 1600 nm.

The reason why the zero dispersion wavelength is made outside of the range of 1400 nm to 1600 nm is the same as the reason explained for the optical fiber illustrated in FIG. 1A and FIG. 1B.

For the optical fiber illustrated in FIG. 2A and FIG. 2B as well, only the upper limits of the Rayleigh scattering coefficient, first relative refractive index difference Δ1a, and effective area (Aeff) are defined, but if either the Rayleigh scattering coefficient or first relative refractive index difference Δ1a increases, the other also increases. Further, if either the Rayleigh scattering coefficient or the effective area (Aeff) increases, the other decreases. Therefore, by defining the upper limits of the Rayleigh scattering coefficient, first relative refractive index difference Δ1a, and effective area (Aeff), the lower limits are substantially also defined.

Relationship Between First Embodiment and Second Embodiment

As explained above, the required characteristics of the optical fiber is dependent on the configuration of the optical signal transmission line. Therefore, the refractive index profile is selected to satisfy the transmission characteristics required for each optical fiber. The optical fiber illustrated in FIGS. 1A and 1B and the optical fiber illustrated in FIGS. 2A and 2B are satisfied each required characteristics. The differences in the effects and actions result in differences in the required characteristics of the optical fibers. To realize this, it is possible to suitably select optical fibers of the configurations shown in FIGS. 1A and 1B and FIGS. 2A and 2B.

Note that in the optical fiber illustrated in FIGS. 2A and 2B, generally speaking, by providing the second annular region, there are the merits that the dispersion characteristic shifts to the minus side, the bending loss characteristic becomes better, and the MFD becomes larger, but there are the demerits that as a trade-off the cut-off wavelength $\lambda c$ becomes longer, the manufacturing yield becomes poorer, and the price becomes higher. Therefore, it is possible to select whether the optical fiber of FIGS. 1A and 1B or the optical fiber of FIGS. 2A and 2B in accordance with need.

Other Embodiments of Optical Fiber

The optical fiber according to the present invention is not limited to the optical fibers illustrated in FIGS. 1A and 1B and FIGS. 2A and 2B. Any optical fiber having a refractive index profile including at least one annular region between a center core 11 or 21 and cladding layer 13 or 24, a Rayleigh scattering coefficient of not more than 1 $\mu m^4 \cdot dB/km$, a first relative refractive index difference $\Delta 1$ or $\Delta 1a$ of a positive value of not more than 0.9%, a second relative refractive index difference $\Delta 2$ or $\Delta 2a$ of −0.7% to −0.2%, and an effective area (Aeff) of not more than 60 $\mu m^2$ is included in the scope of optical fibers according to the present invention.

Further, this optical fiber preferably has a zero dispersion wavelength outside of the range of 1400 nm to 1600 nm.

First Embodiment of Optical Signal Transmission System

Figure 3:
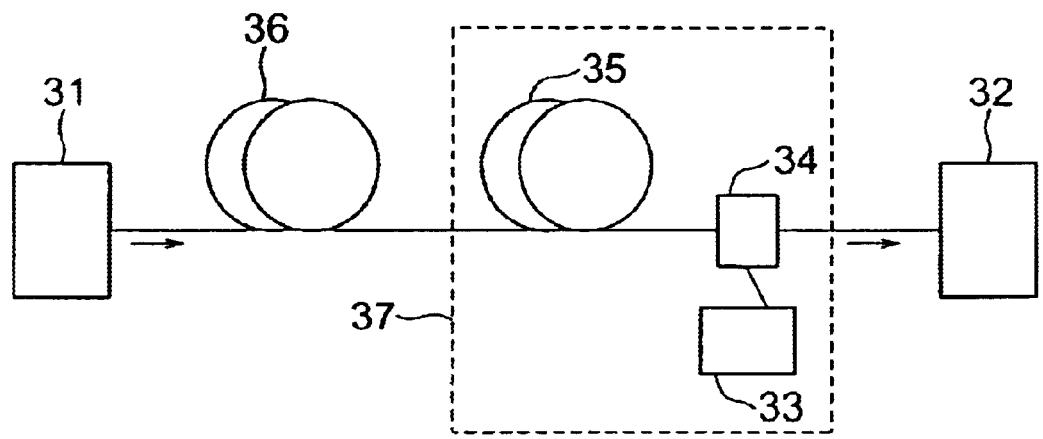
FIG. 3 is a view of the configuration of a first embodiment of an optical signal transmission system using an optical fiber according to the present invention.

FIG. 3 is a view of an embodiment of an optical signal transmission system using an optical fiber according to the present invention.

In FIG. 3, the optical signal transmission system 3 using the optical fiber of the first embodiment has an optical signal transmission apparatus 31, an optical signal reception apparatus 32, a wavelength multiplex stimulated light source 33, an optical coupling means 34, a first optical signal transmission line 35, and a second optical signal transmission line 36.

For at least part of the first optical signal transmission line 35, the optical fiber explained with reference to FIGS. 1A and 1B or FIGS. 2A and 2B is used.

It is also possible to use an optical fiber of an embodiment according to the present invention for at least part of the second optical signal transmission line 36.

The optical signal transmission apparatus 31 includes a light emitting element for transmitting an optical signal corresponding to the transmitted signal, for example, a semiconductor laser, and a transmission signal processing circuit. The transmission signal processing circuit stimulates the semiconductor laser in accordance with the transmitted signal and emits signal light from the semiconductor laser to the second optical signal transmission line 36.

The optical signal reception apparatus 32 includes a light receiving element, for example, a photodiode, and an optical signal processing circuit. It receives an optical signal transmitted from a Raman amplifier 37 by a photodiode, converts it to an electrical signal, and has the signal processing circuit perform desired signal processing on the signal converted to an electrical signal.

The wavelength multiplexed stimulated light source 33, the optical coupling means 34, and the optical signal transmission line 35 form a Raman amplifier (region surrounded by broken line). This type of Raman amplifier 37 is called a distributed Raman amplifier.

The wavelength multiplexed stimulated light source 33 is comprised of a plurality of stimulated light sources different in wavelength and provides a plurality of stimulated light of different wavelengths.

The optical coupling means 34 is comprised of for example a dichroic mirror, WDM coupler, or other WDM filter etc. and has the function of sending the plurality of stimulated light different in wavelength from the wavelength multiplexed stimulated light source 33 to the optical signal transmission line 35. Due to this, Raman amplification is performed inside the optical signal transmission line 35 having the optical fiber explained with reference to FIGS. 1A and 1B or FIGS. 2A and 2B at least at part thereof.

The optical signal transmission line 35 in FIG. 3 is directly related to the action of Raman amplification. The optical fiber used for the optical signal transmission line is required to have a small Rayleigh scattering coefficient and a high Raman efficiency. Further, from the viewpoint of suppressing the occurrence of FWM, the optical fiber used for the optical signal transmission line 35 is required to have a zero dispersion wavelength not in the signal light wavelength band or stimulated light wavelength band.

For example, when the optical fiber illustrated in FIG. 1A and FIG. 1B is used for part of the first optical signal transmission line 35, since the Rayleigh scattering coefficient is not more than 1 $\mu m^4 \cdot dB/km$, the first relative refractive index difference $\Delta 1$ is a positive value of not more than 0.9%, the second relative refractive index difference $\Delta 2$ is from −0.7% to −0.2%, and the effective area (Aeff) is not more than 60 $\mu m^2$, the Raman efficiency is high. Further, since the zero dispersion wavelength is outside of the range of 1400 nm to 1600 nm, the occurrence of FWM is suppressed.

It was difficult to satisfy all of these requirements with a conventional optical fiber, but the optical fiber of the embodiment according to the present invention illustrated in FIG. 1A and FIG. 1B or FIG. 2A and FIG. 2B has the above characteristics and can satisfy these requirements.

Note that distinction of the optical signal transmission line 35 and the optical signal transmission line 36 is convenient for distinction of the portion where Raman amplification is performed and where it is not. The present invention naturally includes embodiments where the optical signal transmission line 35 and the optical signal transmission line 36 are configured by one type of optical fibers.

Further, when Raman amplification is substantially performed in the optical signal transmission line as a whole, that is, the first optical signal transmission line 35 and the second optical signal transmission line 36, it is possible to treat the optical signal transmission line 36 as not existing.

Second Embodiment of Optical Signal Transmission System

Figure 4:
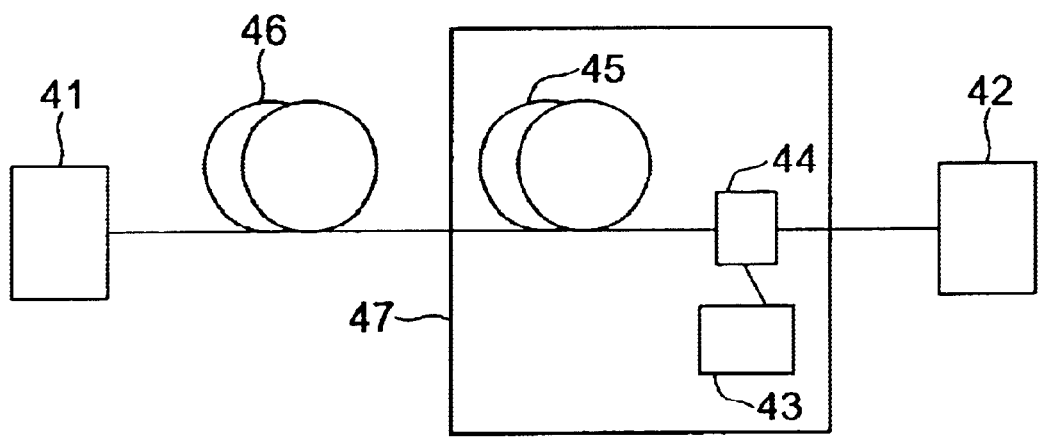
FIG. 4 is a view of the configuration of a second embodiment of an optical signal transmission system using an optical fiber according to the present invention.

FIG. 4 is a view of another embodiment of an optical signal transmission system using an optical fiber according to the present invention.

In FIG. 4, the optical signal transmission system 4 using an optical fiber of the second embodiment has an optical signal transmission apparatus 41, an optical signal reception apparatus 42, a wavelength multiplexed stimulated light source 43, an optical coupling means 44, an optical signal amplification fiber 45, and an optical fiber 46.

The optical fiber explained with reference to FIG. 1A and FIG. 1B or FIG. 2A and FIG. 2B is used for at least part of the optical signal amplification fiber 45.

The optical fiber explained with reference to FIG. 1A and FIG. 1B or FIG. 2A and FIG. 2B is used for at least part of the optical fiber 46.

The wavelength multiplexed stimulated light source 43, optical coupling means 44, and optical signal amplification fiber 45 form a Raman amplifier 47 (area surrounded by solid line). This type of Raman amplifier 47 is called a discrete Raman amplifier.

The wavelength multiplexed stimulated light source 43 and optical coupling means 44 are similar to the wavelength multiplexed stimulated light source 33 and optical coupling means 34 explained with reference to FIG. 3.

With the configuration of the optical signal transmission system using an optical fiber of FIG. 4, Raman amplification is performed inside the optical amplification fiber 45.

The optical signal transmission line 45 is directly related to Raman amplification. The optical fiber used for the optical signal amplification fiber 45 is required to have a small Rayleigh scattering coefficient and a high Raman efficiency. Further, from the viewpoint of suppressing the occurrence of FWM, the optical fiber used for the optical signal amplification fiber 45 is required to have a zero dispersion wavelength not in the signal light wavelength band or stimulated light wavelength band.

It was difficult to satisfy all of these requirements with a conventional optical fiber, but the optical fiber according to the present invention can satisfy these requirements.

Difference Between Raman Amplifier 37 of FIG. 3 and Raman Amplifier 47 of FIG. 4

The difference between a Raman amplifier 37 called a distributed Raman amplifier comprised of the wavelength multiplexed stimulated light source 33, optical coupling means 34, and optical signal transmission line 35 illustrated in FIG. 3 and a Raman amplifier 47 called a discrete Raman amplifier comprised of the wavelength multiplexed stimulated light source 43, optical coupling means 44, and optical signal amplification fiber 45 illustrated in FIG. 4 will be explained next.

Raman amplification is amplification occurring in a transmission line (transmission fiber) as explained above, so can be called a system for introducing amplified light other than transmission light into the transmission line. The case of use of a fiber in a cable as the transmission line is referred to as the "distributed type" illustrated in FIG. 3, while the case of introducing amplified light into a fiber built into equipment like a dispersion-compensating module (in state wrapped into a coil and installed in a relay station etc.) is referred to as a "discrete type".

The difference between the optical signal transmission line 35 of FIG. 3 and the optical signal amplification fiber 45 of FIG. 4 is the difference in the mode of use explained above (whether used as cable or other transmission line or used in a manner built into equipment such as a dispersion-compensating module).

There are various types of optical fibers used along with the transmission lines and dispersion-compensating modules depending on the configuration and application of the transmission lines and transmission systems. The ones relating to the present invention, however, are required to have the refractive index profile of FIGS. 1A and 1B or FIGS. 2A and 2B. The definitions of the refractive index difference and other minor parameters is dependent on the type or application, however, so in the present invention, the content described in the specification is covered.

The Raman amplifier 37 of FIG. 3 shows a conceptual range including even transmission lines where Raman amplification occurs and is illustrated with the fiber 35 and fiber 36 as separate though the same. On the other hand, the Raman amplifier 47 of FIG. 4 is illustrated with the fiber in the dispersion-compensating module as the optical amplification fiber 45.

Next, the efficacy of the optical fiber according to the present invention and an optical signal transmission system using that optical fiber will be explained with reference to examples.

Examples of Optical Fibers

Optical fibers of the first and second embodiments according to the present invention and optical fibers of comparative examples are shown in Table 1.

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Δ1 | 0.50 | 0.62 | 0.85 | 0.30 | 1.10 | 2.00 |
| Δ2 | −0.25 | −0.41 | −0.43 | None | −0.15 | −0.52 |
| Δ3 | 0.22 | None | None | None | 0.30 | None |
| Cladding internal diameter | 22.2 | 14.8 | 13.1 | 10.0 | 15.0 | 3.8 |
| Dispersion | 11.6 | 10.6 | 7.2 | 16.9 | 4.0 | −75 |
| Rayleigh scattering coefficient | 0.89 | 0.94 | 0.97 | 0.90 | 1.10 | 2.20 |
| Aeff | 57 | 30 | 30 | 79 | 72 | 18 |

Example 1 is an example of an optical fiber of the configuration illustrated in FIG. 2A and FIG. 2B exhibiting values of relative refractive index differences Δ1$a$, Δ2$a$, and Δ3$a$, while Examples 2 and 3 are examples of optical fibers of the configuration illustrated in FIGS. 1A and 1B exhibiting values of the relative refractive index differences Δ1 and Δ2, but not a value of the relative refractive index difference Δ3$a$.

Comparative Example 1 is an example of a single mode fiber (SMF) since only the relative refractive index difference Δ1 is exhibited.

Comparative Example 2 is an example of an optical fiber of the configuration illustrated in FIGS. 2A and FIG. 2B since Δ1, Δ2, and Δ3 are exhibited. It is an example of an optical fiber having a high relative refractive index difference Δ1 of 1.10, a large value of the Rayleigh scattering coefficient of at least 1.1, and increasing in much more dopant for raising the higher refractive index of the core. The optical fiber of Comparative Example 2 is used for the optical signal transmission line as an optical fiber enlarged in effective area (Aeff).

Comparative Example 3 is an example of an optical fiber of the configuration illustrated in FIG. 1A and FIG. 1B since Δ1 and Δ2 are exhibited. However, it is an example of a dispersion-compensating fiber (DCF) reduced in dispersion to −75 ps/nm/km and an example having a high relative refractive index difference Δ1 of 1.10, a large value of the Rayleigh scattering coefficient of at least 2.2, and increasing in much more dopant for raising the higher refractive index of the core.

In Table 1, the units of the relative refractive index differences Δ1, Δ1$a$, Δ2, Δ2$a$, and Δ3$a$ are %, the unit of the cladding internal diameter is $\mu$m, the unit of the dispersion is ps/nm/km, the unit of the effective area (Aeff) is $\mu m^2$, and the unit of the Rayleigh scattering coefficient is $\mu m^4 \cdot$dB/km.

In Table 1, all of the optical fibers of Examples 1 to 3 as embodiments according to the present invention satisfy the conditions of having a refractive index profile including at least one annular region between the center core and the cladding layer, a Rayleigh scattering coefficient of not more than 1 $\mu m^4 \cdot$dB/km, a first relative refractive index difference Δ1 or Δ1$a$ of a positive value of not more than 0.9%, a second relative refractive index difference Δ2 of from −0.7% to −0.2%, and an effective area (Aeff) of not more than 60 $\mu m^2$, so the optical fibers of the embodiments according to the present invention are suitable for Raman amplification.

The Rayleigh scattering coefficient is a parameter which fluctuates affected by various factors such as the refractive index profile, glass composition, and manufacturing conditions. It cannot be defined even if just for example defining the shape of the refractive index profile.

From the viewpoint that it is good to measure the Rayleigh scattering coefficient of an optical fiber directly when trying to consider a Rayleigh scattering coefficient for judgement of the suitability of an optical fiber used for a Raman amplification system for the system, the inventors considered a Rayleigh scattering coefficient of optical fibers used for Raman amplification systems and discovered and defined suitable values for the same as illustrated in Table 1 and Table 2.

First Embodiment of Optical Signal Transmission System

Optical signal transmission experiments were conducted in the optical signal transmission system of FIG. 3 using the optical fibers of Example 1, Example 2, Example 3, Comparative Example 1, and Comparative Example 2 of Table 1 for the optical signal transmission line 35.

As prerequisites for the experiments, the distance between the optical signal transmission apparatus 31 and the optical signal reception apparatus 32 was made about 100 km, 16 optical signals of 40 Gbps/ch were arranged at equal intervals in the range of wavelength of 1540 nm to 1564 nm, and the level of the signal light in the optical signal reception apparatus 32 was made constant among the experiments. The wavelengths and powers of the light sources included in the wavelength multiplexed stimulated light source 33 were adjusted so that the wavelength-to-gain characteristic became relatively flat, for example, exhibited a deviation of within 1 dB.

The types of optical fibers used for the optical signal transmission system 35, the power of the stimulated light, and the results of the optical signal transmission experiments are shown in Table 2. Note that the power of the stimulated light is the total power, and the unit is mW. The results of the optical signal transmission experiment are indicated as "good" when the value of the BER does not deteriorate through the optical signal transmission system and as "poor" when it deteriorates.

TABLE 2

|  | Ex. 1 | Ex. 2 | Ex. 3 | Comp. Ex. 1 | Comp. Ex. 2 |
| --- | --- | --- | --- | --- | --- |
| Power of stimulated light | 600 | 400 | 300 | 1600 | 800 |
| Results | Good | Good | Good | Poor | Poor |

From the results of Table 2, it is learned that the optical signal transmission system of FIG. 3 using the optical fibers of Examples 1 to 3 based on embodiments according to the present invention for at least part of the first optical signal transmission line 35 has the following advantages compared with the optical signal transmission system of FIG. 3 using optical fibers of Comparative Examples 1 and 2.

(1) Case of Use of Optical Fiber of Example 1

Comparing the optical fiber of Example 1 according to the present invention with the optical fiber of Comparative Example 1, as shown in Table 1, the Rayleigh scattering coefficients are substantially the same, but the optical fiber of Example 1 according to the present invention has a smaller effective area (Aeff), so the Raman efficiency is improved in the optical signal transmission system of FIG. 3. That is, the optical fiber of Example 1 according to the present invention can be said to be more suitable for Raman amplification compared with the optical fiber of Comparative Example 1.

Comparing the optical fiber-of Example 1 according to the present invention with the optical fiber of Comparative Example 2, as shown in Table 1, the optical fiber of Example 1 according to the present invention has a smaller Rayleigh scattering coefficient and the effective area (Aeff) compared with Comparative Example 2, so the SNR and Raman efficiency are improved in the optical signal transmission system of FIG. 3. That is, the optical fiber of Example 1 according to the present invention is more suitable for Raman amplification compared with the optical fiber of Comparative Example 2.

(2) Case of Use of Optical Fiber of Example 2

Comparing the optical fiber of Example 2 according to the present invention with the optical fiber of Comparative Example 1, as shown in Table 1, the optical fiber of Example 2 according to the present invention has a larger Rayleigh scattering coefficient by several % and a smaller effective area (Aeff), so the Raman efficiency is substantially improved in the optical signal transmission system of FIG. 3. That is, the optical fiber of Example 2 according to the present invention is more suitable for Raman amplification compared with the optical fiber of Comparative Example 1.

Comparing the optical fiber of Example 2 according to the present invention with the optical fiber of Comparative Example 2, as shown in Table 1, it has both a smaller Rayleigh scattering coefficient and the effective area (Aeff), so the SNR and Raman efficiency are improved in the optical signal transmission system of FIG. 3. That is, it can be said that the optical fiber of Example 2 according to the present invention is more suitable for Raman amplification compared with the optical fiber of Comparative Example 2.

(3) Case of Use of Optical Fiber of Example 3

Even when using the optical fiber of Example 3 according to the present invention for the optical signal transmission line 35, substantially the same effects are obtained as using the optical fiber of Example 2 according to the present invention.

Second Embodiment of Optical Signal Transmission System

In the optical signal transmission system of FIG. 4, optical signal transmission experiments were carried out using the optical fibers of Example 2, Example 3, and Comparative Example 3 of Table 1 for the optical signal amplification fiber 45.

As preconditions of the experiments, the distance between the optical signal transmission apparatus 41 and the optical signal reception apparatus 42 was made about 100 km, 16 optical signals of 40 Gbps/ch were arranged at equal intervals in the range of wavelength of 1540 nm to 1564 nm, and the level of the signal light in the optical signal reception apparatus 42 was made constant in the experiments. The length of the optical signal amplification fiber 45 and the wavelengths and powers of the light sources included in the wavelength multiplexed stimulated light source 43 were adjusted so that the wavelength-to-gain characteristic became relatively flat, for example, exhibited a deviation of within 1 dB.

The type and length of the optical fiber used for the optical amplification fiber 45, the power of the stimulated light, and the results of optical signal transmission experiments are shown in Table 3 for examples of the invention and comparative examples. Note that in Table 3, the unit for the length of optical fibers is km. The results of the optical signal transmission experiments are indicated as "good" or "poor" in the same way as in Table 2.

TABLE 3

|  | Example 2 | Example 3 | Comp. Ex. 3 |
|---|---|---|---|
| Length of optical fiber used | 30 | 20 | 20 |
| Power of stimulated light | 650 | 500 | 350 |
| Results | Good | Good | Poor |

From the results of Table 3, it is learned that the optical signal transmission system of FIG. 4 using the optical fibers of Examples 2 and 3 based on embodiments according to the present invention has the following advantages over the optical signal transmission system of FIG. 4 using the optical fiber of Comparative Example 3.

(1) Case of Use of Optical Fiber of Example 2

Comparing the optical fiber of Example 2 according to the present invention with the optical fiber of Comparative Example 3, the optical fiber of Example 2 according to the present invention has a small Rayleigh scattering coefficient and a large effective area (Aeff). Therefore, in the optical signal transmission system of FIG. 4, while the Raman efficiency drops, the SNR is improved. That is, the optical fiber of Example 2 according to the present invention can be said to better enable low noise Raman amplification compared with the optical fiber of Example 1.

(2) Case of Use of Optical Fiber of Example 3

Even when using the optical fiber of Example 3 according to the present invention for the optical signal amplification fiber 45, substantially the same effects are obtained as with the case of use of the optical fiber of Example 2 according to the present invention.

As shown in Table 2 and Table 3, it is learned that an optical signal transmission system using Raman amplification is realized well by the optical fibers of Examples 1 to 3 of Table 1. Further, it is learned that the optical signal transmission systems given as comparative examples are not suitable for Raman amplification.

As explained above, according to the present invention, there are the superior effects that it becomes possible to obtain an optical fiber suitably performing Raman amplification and possible to realize an optical signal transmission system using Raman amplification.

While the invention has been described with reference to specific embodiments chosen for purpose of illustration, it should be apparent that numerous modifications could be made thereto by those skilled in the art without departing from the basic concept and scope of the invention.

What is claimed is:

1. An optical fiber having a refractive index profile and including at least one annular region between a center core and a cladding layer, having
    a Rayleigh scattering coefficient not more than 1 $\mu m^4 \cdot dB/km$,
    a first relative refractive index difference $\Delta 1$ of said center core with respect to said cladding layer of a positive value not more than 0.9%,
    a second relative refractive index difference $\Delta 2$ of an annular region adjoining said center core with respect to said cladding layer from −0.7% to −0.2%, and
    an effective area (Aeff) not more than 60 $\mu m^2$.

2. An optical fiber as set forth in claim 1, having a zero dispersion wavelength outside of a range of 1400 nm to 1600 nm.

3. An optical fiber as set forth in claim 1, wherein
    a single annular region formed at a periphery of said center core,
    said cladding layer is formed at a periphery of said annular region, and
    a refractive index of said annular region is lower than a refractive index of said cladding layer.

4. An optical fiber as set forth in claim 1, wherein
    a first annular region is formed at a periphery of said center core,
    a second annular region is formed at a periphery of said first annular region, and
    said cladding layer is formed at a periphery of said second annular region,
    a refractive index of said first annular region being lower than a refractive index of said cladding layer, and
    a refractive index of said second annular region being higher than a refractive index of said cladding layer and lower than a refractive index of said center core.

5. An optical signal transmission system having:
    an optical signal transmission apparatus for transmitting an optical signal,
    a Raman amplification means for amplifying signal light transmitted from said optical signal transmission apparatus, and
    an optical signal reception apparatus for receiving an optical signal transmitted from said Raman amplification means,
    said Raman amplification means having
        an optical signal transmission line including in at least part an optical fiber having a refractive index profile, including at least one annular region between a center core and a cladding layer and having a Rayleigh scattering coefficient not more than 1 $\mu m^4 \cdot dB/km$, a first relative refractive index difference $\Delta 1$ of said center core with respect to said cladding layer of a positive value not more than 0.9%, a second relative refractive index difference $\Delta 2$ of an annular region adjoining said center core with respect to said cladding layer from −0.7% to −0.2%, and an effective area (Aeff) not more than 60 $\mu m^2$ and receiving signal light emitted from said optical signal transmission apparatus,
        a wavelength multiplexed stimulated light source for providing a plurality of stimulated light having different wavelengths, and
        an optical coupling means for coupling an optical signal transmitted from said optical signal transmission line and an optical signal transmitted from said wavelength multiplexed stimulated light source, and performing Raman amplification by firing wavelength multiplexed stimulated light to said optical fiber in said optical signal transmission line from said wavelength multiplexed stimulated light source.

6. An optical signal transmission system as set forth in claim 5, wherein said optical fiber included in said optical signal transmission line has a zero dispersion wavelength outside of a range of 1400 nm to 1600 nm.

* * * * *